United States Patent [19]

Bloom

[11] 3,973,577
[45] Aug. 10, 1976

[54] FLUID CONTROL VALVES
[75] Inventor: Joseph Louis Bloom, Droitwich, England
[73] Assignee: Joseph Lucas (Industries) Limited, Birmingham, England
[22] Filed: May 23, 1975
[21] Appl. No.: 580,411

Related U.S. Application Data
[62] Division of Ser. No. 485,423, July 3, 1974, abandoned.

[30] Foreign Application Priority Data
July 9, 1973 United Kingdom............... 32667/73

[52] U.S. Cl.............................. 137/82; 137/625.3; 251/234
[51] Int. Cl.² ......................................... F15B 5/00
[58] Field of Search ........... 251/234; 137/82, 625.3; 139/85, 86, 84

[56] References Cited
UNITED STATES PATENTS
3,219,049  11/1965  Joesting ......................... 251/234 X OTHER PUBLICATIONS
Lucas Aerospace Ltd.; A Lucas Fuel System Designed for Large Multi Spool By–Pass Jet Engines, 1973.

Primary Examiner—Alan Cohan
Attorney, Agent, or Firm—Holman & Stern

[57] ABSTRACT

A fluid control valve has a port means across which a control element, mounted on a lever, is slidable. An input control arm rotates a cam which imparts linearly-related angular movement to a further lever. A roller is engaged between the two levers and is movable to vary the distances from the pivotal axes of the levers to their points of engagement with the roller. These distances are different on each lever. Movement of the roller thus varies the linear relationship between movement of the input arm and the control element.

21 Claims, 12 Drawing Figures

FIG. I.

FLUID CONTROL VALVES

This is a divisional application Ser. No. 485,423, filed July 3, 1974, now abandoned.

BACKGROUND OF THE INVENTION

This invention relates to fluid control valves.

In some gas turbine engine fuel control systems, there is a requirement for a valve which provides a fluid pressure output signal which increases substantially linearly with displacement of a valve control element, over at least part of the range of movement of the control element. It is required that the slope of this linear relationship portion of the valve characteristic should be capable of being accurately set.

OBJECT AND SUMMARY OF THE INVENTION

It is an object of the present invention to provide a valve in which adjustment of the slopes of the valve characteristic can readily be effected.

According to the invention, a fluid control valve comprises a body having an inlet and an outlet, a port means between said inlet and outlet, a control element of platelike form co-acting with said port means and pivotally movable about an axis to progressively uncover the port means, selector means movable to vary the position of said control element and an adjustable linkage interconnecting said selector means and said control element for varying the angular movement of the control element in response to a given movement of the selector means, with said linkage including a first lever pivotally mounted in said body for movement by said selector means, a second lever pivotally mounted in said body and connected to said control element for movement therewith, a transmission member engaging said first and second levers, and means for moving said transmission member so as to vary the position thereof relative to the pivotal axis of one of said first and second levers.

In a preferred embodiment, the transmission member is moved so as simultaneously to vary the position thereof relative to the pivotal axes of both said first and second levers.

An example of the invention will now be described with reference to the accompanying drawings, in which:

DETAILED DESCRIPTION OF THE INVENTION

Figure 7:
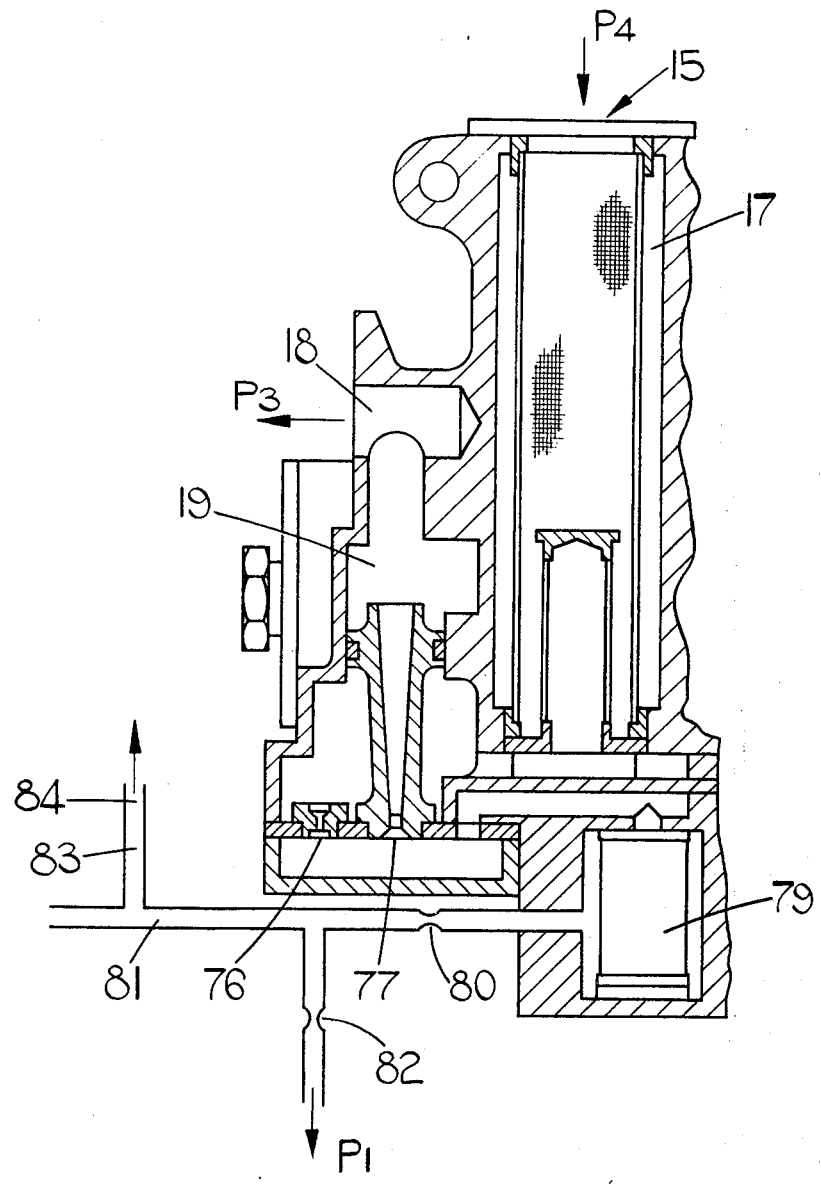

The air pressure ratio control apparatus shown has a body 10 which is subdivided into a plurality of chambers. One of these chambers 11 contains a valve according to the invention, indicated generally at 12. The control apparatus is, in use, located at the intake of a gas turbine engine, and chamber 11 is provided with a port 13 by means of which a first pressure within chamber 11 is the intake pressure $P_1$ of the engine compressor. A second pressure, the intermediate pressure $P_3$ from the compressor, is admitted via a port 18 to a chamber 19 (FIG. 7) in the body 10. The body 10 is provided with further ports 14, 15 through which a third pressure, the engine compressor delivery pressure $P_4$, is admitted to respective chambers 16, 17 (FIG. 7) within the body 10.

Figure 5:
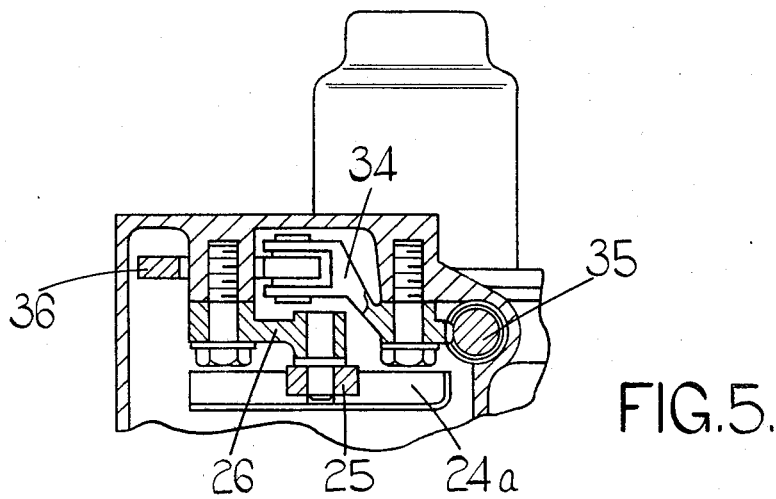

Adjacent chamber 11 is a further chamber 20. A common wall 21 between chambers 11, 20 is provided with a number of through holes 22. Mounted for pivotal movement within chamber 11 by means of a control lever 23 is a cam 24. Cam 24 is provided with a cowl-like extension 24a (FIG. 5), and thus has a pair of opposed, parallel cam surfaces between which a follower roller 25 is constrained to move. Roller 25 is carried by an arm 26 pivotally mounted in the body 10.

An arm 27 is also pivotally mounted in the body 10 for movement about an axis which is coincident with the axis of movement of cam 24. Cam 24 is, in fact, supported by a hollow shaft 28 within which a spindle 29, carrying arm 27, is journalled. Arm 27 supports a blade 30 (FIG. 2), for movement with arm 27 about the pivotal axis of the latter. Secured to the free end of blade 30 is a carrier member 31 on which is mounted a plate-like control element 32 which engages a face of wall 21. Element 32 is urged against wall 21 by a spring 33 which is engaged between lever 27 and control element 32.

Figure 1:
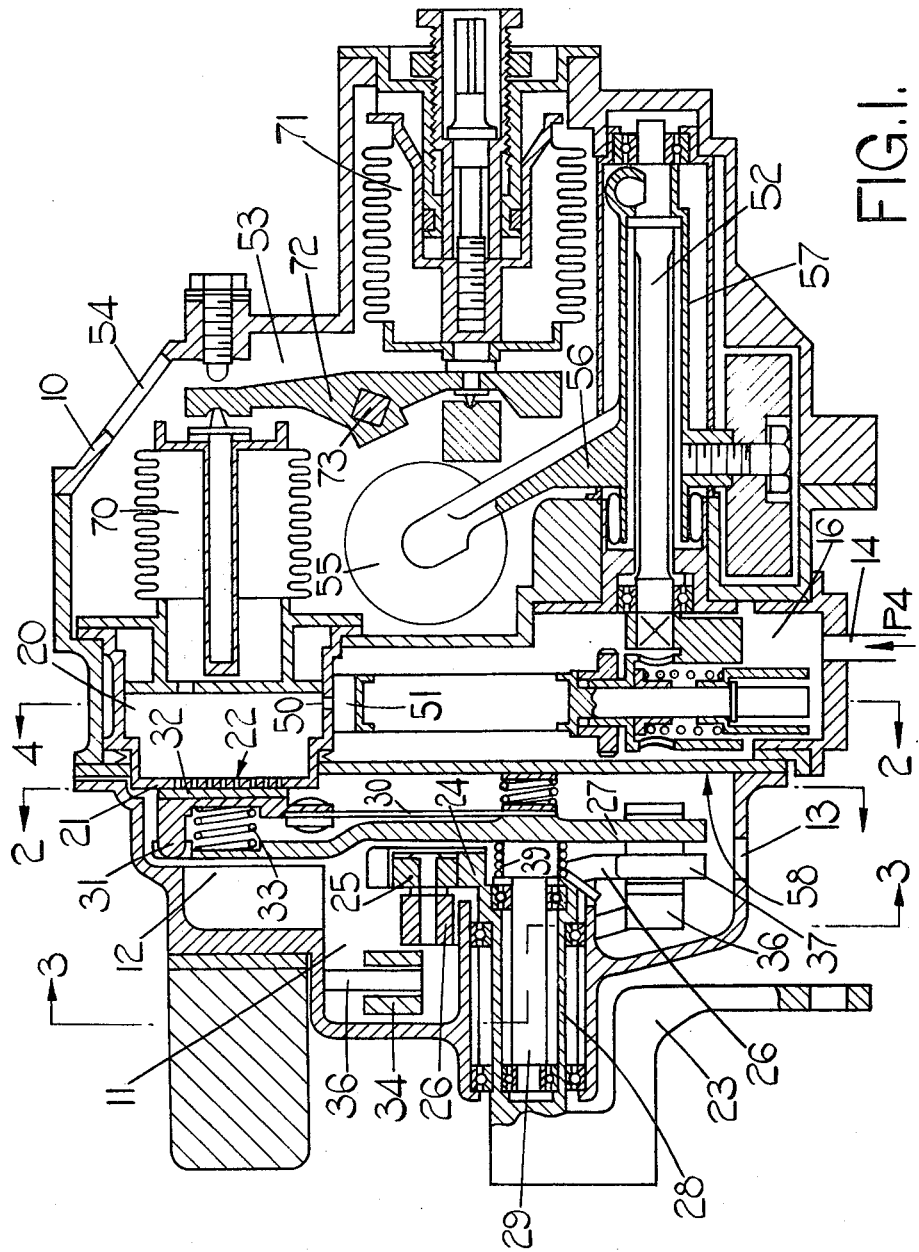
FIG. 1 shows a section through an air pressure ratio control apparatus, incorporating a valve according to the invention.
Figure 2:
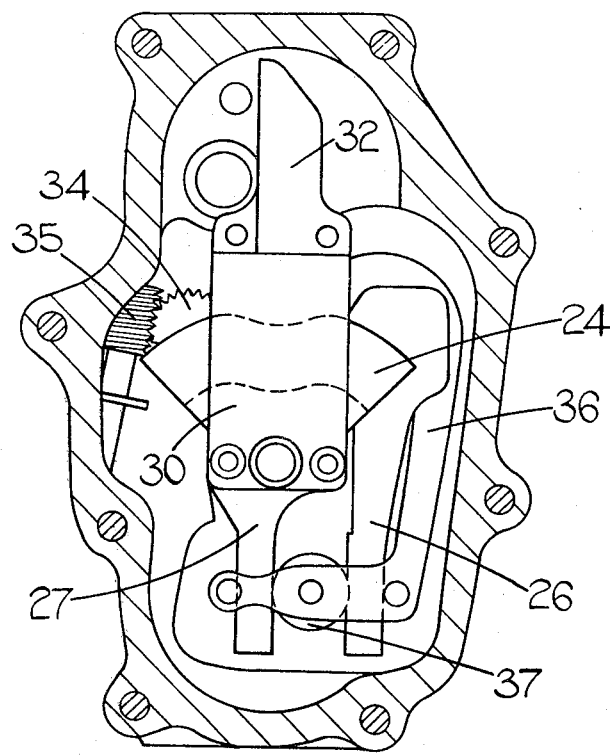
FIGS. 2, 3 and 4 are part-sections on the corresponding lines in FIG. 1, FIGS. 5, 6 and 7 are part-sections on the corresponding lines in FIG. 3.
Figure 3:
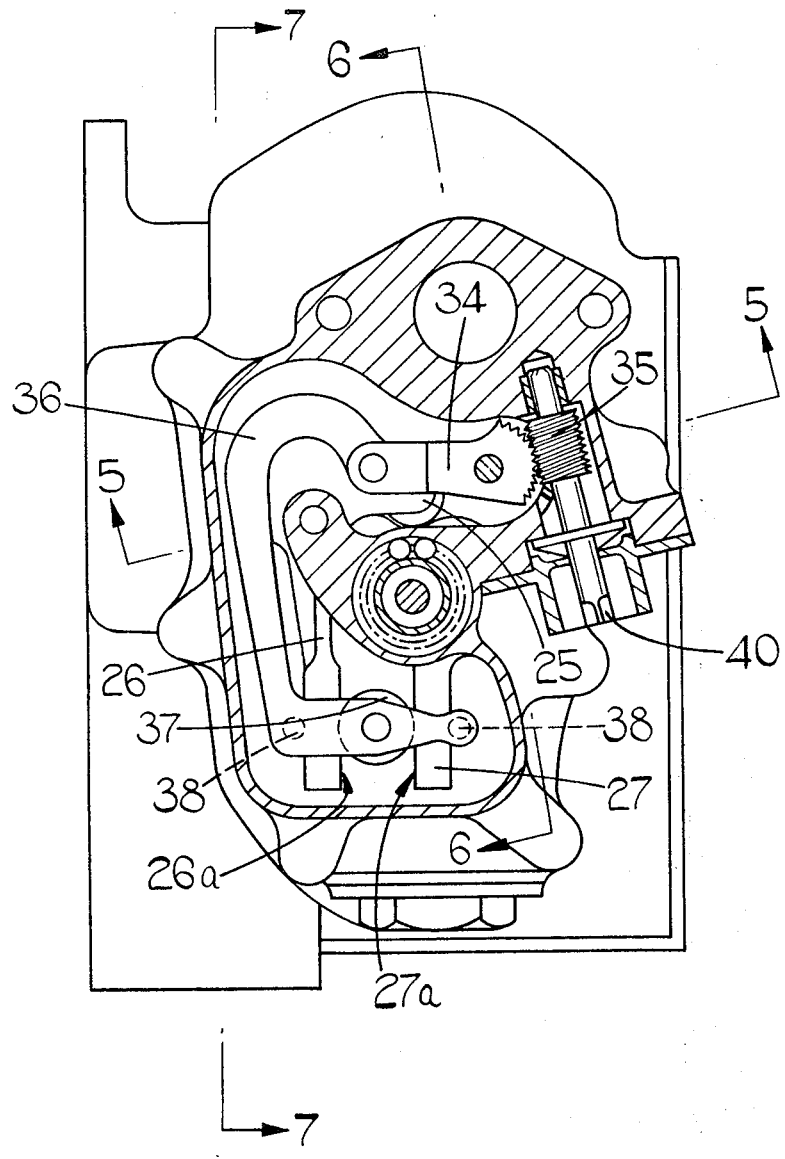

A crank 34 is mounted for movement about a pivotal axis in the body 10, and has a toothed quadrant which meshes with a worm 35 (FIG. 2). A carrier 36 is pinned to the free end of crank 34. Levers 26, 27 are provided with flat faces 26a, 27a which oppose one another. Engaged between faces 26a, 27a is a roller 37 (FIG. 3) mounted on the end of carrier 36 remote from its connection with crank 34. Pins 38 extend from carrier 36 and engage levers 26, 27 to maintain the latter in contact with roller 37. Lever 27 is biased in a direction to cause control element 32 to shut the valve, by means of a torsion spring 39 (FIG. 1).

Figure 4:
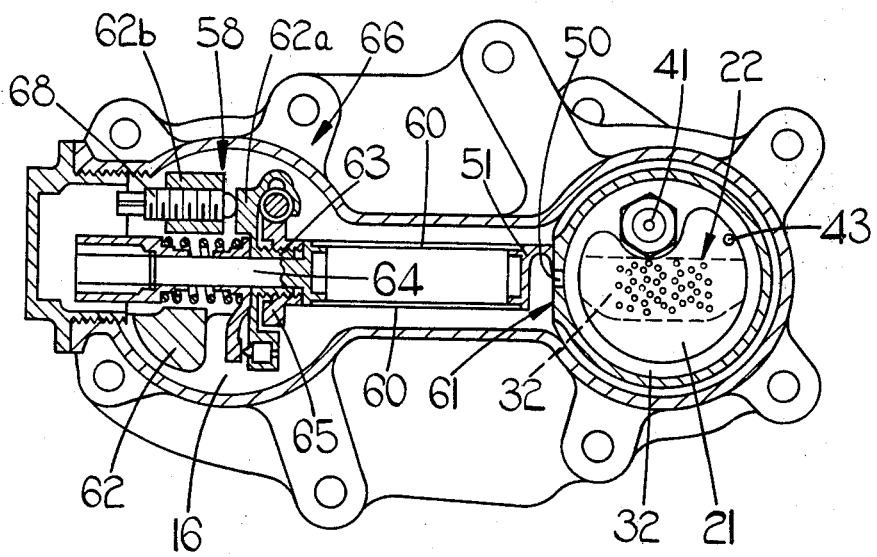

In use, movement of lever 27 causes control element 32 to be moved to progressively uncover the holes 22, and thus to regulate fluid flow between chambers 11, 20. The cam 24 has a profile as indicated in dotted outline in FIG. 2, such that movement of cam 24 in either direction from its central position will urge the lever 27 clockwise (as seen in FIGS. 2 and 4) about its pivot to progressively uncover holes 22.

Rotation of worm 35 by means of a stem 40 (FIG. 3) pivots crank 34 to move the point of engagement of roller 37 with levers 26, 27. The structure is such that the distance of the point of engagement of roller 37 from the pivotal axis of lever 26 is greater than from the pivotal axis of lever 27. The effect of movement of roller 37 is thus greater upon lever 27. The response of lever 27, and thus of control member 32, to movements of control lever 23 can thereby readily be adjusted.

Figure 6:
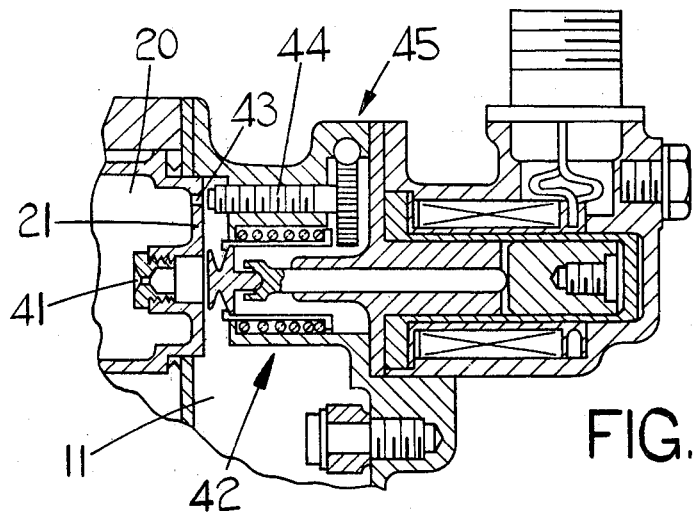

As well as holes 22, the plate 21 has a bypass aperture 41 (FIG. 6) which can be shut off by means of a solenoid valve 42. Plate 21 also has an adjustable flow restrictor 43, the flow area of which can be altered by a threaded stud 44 rotatable by a worm and worm wheel arrangement 45.

Chamber 20 communicates, via an orifice 50, with chamber 16. An adze-type closure member 51 co-operates with orifice 50 to provide a varible flow restrictor. Adze 51 is mounted for movement by a spindle 52 (FIG. 1) which is journalled in the body 10, and which passes sealingly between chamber 16 and a further chamber 53 in the body 10. Chamber 53 communicates via a port 54 with compressor intake pressure $P_1$. An evacuated resilient bellows unit 55 in chamber 53 is responsive to pressure $P_1$ and is engaged by a lever arm 56 whose position is transmitted to spindle 52 by a torsion tube 57.

Adze 51 is carried by an arrangement denoted generally 58 by means of which the relative positions of adze 51 and spindle 52 can be adjusted. Adze 51 is mounted on a pair of parallel resilient strips 60 (FIG. 4) whereby the face of the adze is maintained in contact with a flat face 61 on the wall between chambers 16, 20, notwithstanding pivotal movement of spindle 52. Mounted on spindle 52 is a carriage block 62 having an integral threaded bush 63 through which a flanged stem 64 extends and the strips 60 are secured to the flange of the stem 64. A threaded sleeve 65 engages bush 63 and abuts the flange of stem 64. Sleeve 65 is rotatable by a worm and worm wheel arrangement 66 to urge the adze 51 towards and away from the face 61.

The carriage block 62 is formed so that a portion 62a which includes the bush 63 is resiliently movable with respect to the remaining portion 62b of the block. Portion 62b carries a screw 68 which engages portion 62a, whereby the leading edge of adze 51 may be adjusted relative to the orifice 50, independently of movement of spindle 52. Stem 64 can be rotated within bush 63 by means of a tool applied to stem 64, whereby the angle between the leading edge of adze 51 and the axis of spindle 52 may be varied. The rate at which adze 51 covers or uncovers the orifice, for a constant rate of rotation of spindle 52, is thus adjustable.

Chamber 20 communicates with the inside of a bellows unit 70 which is within chamber 53. A further bellows unit 71, also in chamber 53, is evacuated. Bellows units 70, 71, engage opposite ends of a lever 72 which is secured to a shaft 73 with, the arrangement being that an increase in the pressure within bellows 70, or a decrease in pressure $P_1$, causes lever 72 to rotate shaft 73 clockwise, as seen in FIGS. 1 and 9.

Figure 8:
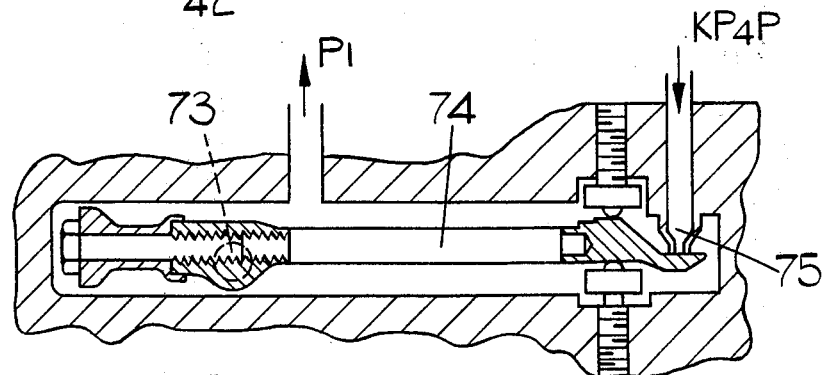
FIG. 8 shows a detail of the apparatus of FIG. 1.
Figure 9:
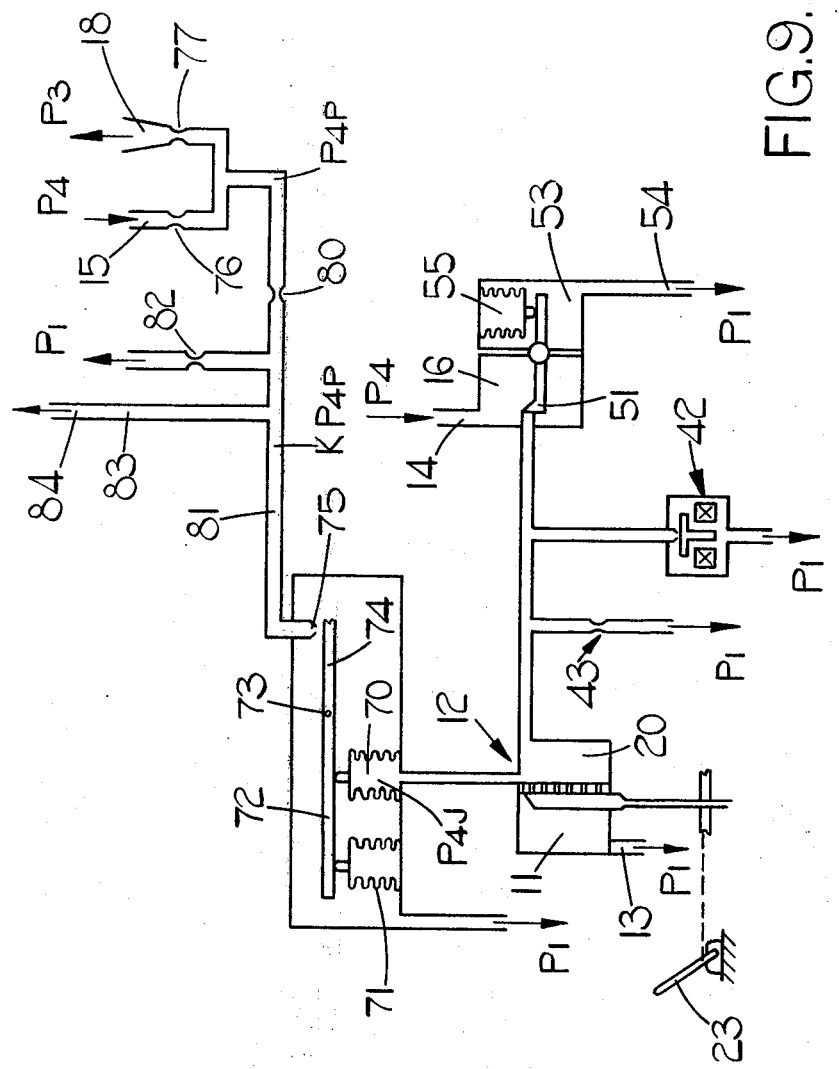
FIG. 9 shows the apparatus of FIG. 1 diagrammatically.

As shown in FIGS. 8 and 9, shaft 73 is also secured to a further level 74, one end of which acts as a closure member for an orifice 75 which thus provides a third variable flow restrictor. Inlet port 15 (FIGS. 7 and 9) communicates with port 18 via a flow restrictor 76 and a venturi 77. A filter unit 78 is located between inlet 15 and restrictor 76, and a further filter unit 79 is located between the junction of restrictor 76 and venturi 77, and a fixed flow restrictor 80 in a passage 81. Passage 81 communicates with orifice 75 (FIG. 9). Passage 81 also communicates, via an adjustable restrictor 82, with pressure $P_1$ and, via an outlet passage 83, with an outlet connection 84 for the apparatus as a whole.

In use, air flows from port 14 past adze control member 51 at a rate dependent on pressure $P_1$ acting on bellows 55. This air flows through restrictor 43 and valve 12 in parallel to return to pressure $P_1$, thus generating an intermediate control pressure $P_{4J}$ in chamber 20. The value of control pressure $P_{4J}$ is thus dependent on $P_1$ and on the setting of valve 12. There is a linear relationship between the displacement of control lever 23 from its mid-position, and the value of control pressure $P_{4J}$. As described above, this linear relationship may be adjusted so that desired slopes for the valve characteristic may be set accurately.

Airflow between ports 15, 18, in response to pressures $P_4$, $P_3$ respectively, generates an intermediate pressure $P_{4P}$ upstream of restrictor 80. Airflow through restrictor 80, and restrictor 82 and orifice 75 in parallel, generates a pressure $KP_{4P}$ in passage 83. Pressure $KP_{4P}$ is dependent on the flow through orifice 75, and hence on pressure $P_1$ and $P_{4J}$. Pressure $KP_{4P}$ is applied to a pressure sensitive control element in an engine fuel metering device.

Solenoid valve 42 is normally shut. If valve 42 is opened, the pressure $P_{4J}$ in chamber 20 falls to a lower value, but may nevertheless subsequently be varied linearly by means of valve 12.

Figure 10:
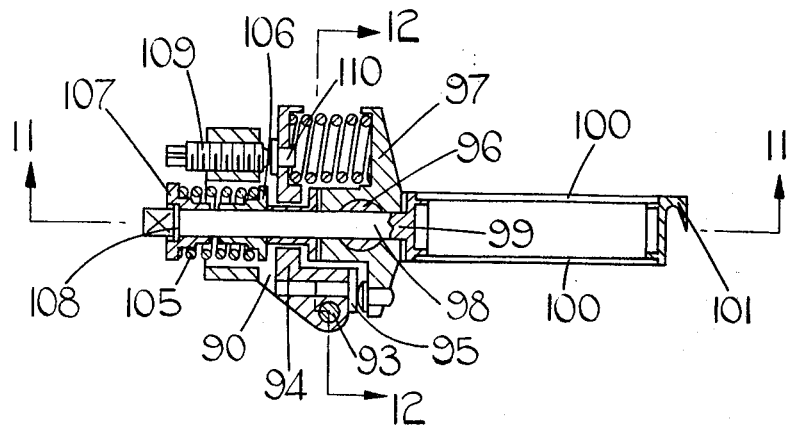
FIG. 10 shows an alternative embodiment of part of the apparatus of FIG. 1, and FIGS. 11 and 12 are sections on the corresponding lines in FIG. 10.
Figure 11:
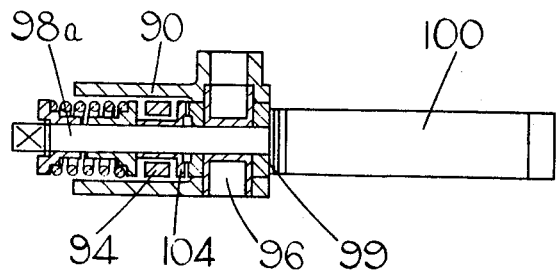
Figure 12:
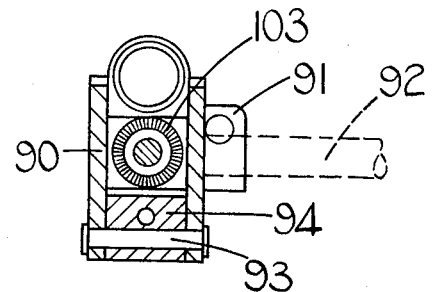

The alternative adze control arrangement shown in FIGS. 10, 11 and 12 and attention is directed to my co-pending application Ser. No. 485,425 filed July 3, 1974, includes a carriage 90 with an integral boss 91 having a bore which enables the carriage 90 to be clamped to a input spindle 92. Mounted on carriage 90 for pivotal movement about a pin 93 is a first lever 94. Lever 94 has an abutment 95 adjacent pin 93, and thus provides a third order lever.

A pin 96 is pivotally mounted in the carriage co-axially with the bore in the boss 91. A second lever 97 is carried on pin 96 and a flange stem 98 passes through the pin 96 and lever 97, so that the pin 96, lever 97 and stem 98 move in unison about the axis of pin 96. Lever 97 is a first order lever, one end of which engages the abutment 95 of lever 94. A compression spring is engaged between the other end of lever 97 and the end of lever 94 remote from the pin 93.

Secured to the flange 99 of stem 98 are a pair of resilient strips 100, to the other ends of which is secured a control member in the form of an adze blade 101. Shim washers 102 are located between flange 99 and an adjacent surface of lever 97, to enable the adze blade 101 to be brought into contact with a surface which has an associated metering orifice. A face of lever 97 remote from the shim washers 102 is formed with a plurality of radially extending serrations 103. A portion 98a of the stem 98 which extends clear of the lever 97 has a square cross section and passes through a square bore in a flanged bush 104. The flange of bush 104 is also formed with radially extending serrations which are complementary to, and engaged with, the serrations 103. There are 48 equi-spaced serrations on the lever 97 and on the bush 104. The leading edge of the adze blade 101 may thus be located, in steps of 7½°, relative to the axis of the shaft 92. A compression spring 105 is engaged between bushes 106, 107 which are slidable on stem portion 98a. Bush 107 engages a circlip 108 on stem 98. Spring 105 thus biases the serrated portions into engagement and also urges the flange 99 towards lever 97.

A screw 109 is mounted in the carriage 90 and engages an abutment 110 on lever 94 at the end thereof remote from pivot pin 93. The lever ratio of lever 94 is 10:1, so screw 109 may therefore have a relatively coarse thread and still permit fine adjustment of the axis of stem 98 relative to the carriage 90.

I claim:

1. A fluid control valve arrangement comprising a body having an inlet and an outlet, a perforated port plate between said inlet and outlet, a control element of plate-like form co-acting with said port plate and being pivotally movable about an axis to progressively uncover the perforations in said port plate, the axis of pivotal movement of said control element being substantially perpendicular to the plane of said port plate, selector means movable to vary the position of said control element and an adjustable linkage means interconnecting said selector means and said control element, for varying the angular movement of said control element in response to a given movement of said selector means.

2. The control valve arrangement as claimed in claim 1 in which said linkage means comprises a first lever pivotally mounted in said body for movement by said selector means, a second lever pivotally mounted in said body and connected to said control element for movement therewith, a transmission member engaging said first and second lever, and means for moving said transmission member so as to vary the position thereof relative to the pivotal axis of one of said first and second levers.

3. The control valve arrangement as claimed in claim 2 in which said first and second levers have respective, opposed faces, and said transmission means comprises a rolling element engaged between said faces.

4. The control valve arrangement as claimed in claim 3 in which the distance from the pivotal axis of one of said levers to the location thereon engaged by said rolling element is always greater than the distance from the pivotal axis of the other of said levers to the location thereon engaged by said rolling element.

5. The control valve arrangement as claimed in claim 2 in which said means for moving the transmission member is operable to vary the position thereof relative to the pivotal axis of both of said levers.

6. The control valve arrangement as claimed in claim 2 in which said means for moving the transmission member comprises a carrier having said transmission member mounted at one end thereof, and a crank coupled to said carrier for moving the latter towards and away from the pivotal axis of said one lever.

7. The control valve arrangement as claimed in claim 2 which includes a cam rotatable by said selector means, and a cam follower mounted on said first lever.

8. The control valve arrangement as claimed in claim 7 in which said cam has a profile such that movement of said selector means, in either direction from a central position thereof urges said control element in a direction to uncover said port-plate.

9. The control valve arrangement as claimed in claim 1 which includes a first variable flow restrictor in series with said port-plate and a first pressure sensitive element responsive to the pressure intermediate said port-plate and said first variable flow restrictor.

10. The control valve arrangement as claimed in claim 9 in which said first variable flow restrictor comprises an adze-type control element and actuating means responsive to an increase in a first pressure signal for urging said adze control element to reduce flow through said first variable restrictor.

11. A valve as claimed in claim 10 in which said adze control member includes adjustment means for varying the position of the adze blade independently of said actuating means.

12. A valve as claimed in claim 11 in which said adjustment means comprises a pivotally mounted carriage drivingly connected to said actuating means, said carriage having a resiliently deformable portion to which said adze blade is secured, and means for deflecting said deformable portion relative to the remainder of said carriage.

13. A valve as claimed in claim 11 in which said adjustment means comprises a pivotally mounted carriage drivingly connected to said actuating means, first and second lever element pivotally mounted on said carriage, means for moving said first lever pivotally with respect to the carriage, said adze blade being mounted on said second lever and said first and second levers coacting so that angular movement of said second lever is substantially less than a corresponding movement of said first lever.

14. A valve as claimed in claim 12 which includes means for moving said adze blade towards and away from the pivotal axis of said carriage.

15. A valve as claimed in claim 12 which includes means for varying the angle between a leading edge of said adze blade and the pivotal axis of said carriage.

16. The control valve arrangement as claimed in claim 10 which includes a second variable flow restrictor in parallel with said port-plate.

17. The control valve arrangement as claimed in claim 10 which includes a bypass valve in parallel with said port-plate.

18. A valve arrangement as claimed in claim 9 which includes first and second fixed flow restrictors in series, second and third fluid pressures being applied, in use, to respective ends of the series arrangement of said fixed flow restrictors, a second variable flow restrictor communicating with the interconnection of said first and second fixed restrictors, a signal pressure outlet communicating with a side of said second variable restrictor remote from said interconnection, and a control element for said second variable flow restrictor, said second variable restrictor control element being actuable by said first pressure sensitive element, a decrease in the pressure intermediate said control plate and said first variable flow restrictor acting to increase flow through said second variable flow restrictor.

19. A valve arrangement as claimed in claim 18 which includes a third fixed flow restrictor intermediate said interconnection and said second variable flow restrictor and an outlet passage between said third fixed flow restrictor and said second variable flow restrictor.

20. A valve as claimed in claim 19 which includes a fourth fixed flow restrictor communicating on one side with said outlet passage and subjected, in use, on the other side to said first pressure signal.

21. A valve arrangement as claimed in claim 20 which includes a second pressure sensitive element responsive to said first pressure signal and co-acting with the control element of said first varable flow restrictor, an increase in said first pressure signal acting to decrease flow through said first variable restrictor.

* * * * *